US007659811B2

(12) United States Patent
Flick

(10) Patent No.: US 7,659,811 B2
(45) Date of Patent: Feb. 9, 2010

(54) VEHICLE DEVICE TO ACTIVATE A VISUAL OR AUDIBLE ALERT AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 340 days.

(21) Appl. No.: 11/844,683

(22) Filed: Aug. 24, 2007

(65) Prior Publication Data

US 2009/0051519 A1 Feb. 26, 2009

(51) Int. Cl.
*B60Q 1/00* (2006.01)

(52) U.S. Cl. .................. 340/441; 340/936; 340/426.19; 340/466

(58) Field of Classification Search ................. 340/441, 340/936, 989, 426.19, 466
See application file for complete search history.

(56) References Cited

U.S. PATENT DOCUMENTS

| | | | | |
|---|---|---|---|---|
| 4,608,551 A * | 8/1986 | Takeo et al. | 340/441 |
| 4,837,700 A | 6/1989 | Ando et al. | 364/449 |
| 4,843,578 A * | 6/1989 | Wade | 702/142 |
| 5,024,186 A | 6/1991 | Long et al. | 123/179 B |
| 5,043,736 A | 8/1991 | Darnell et al. | 342/357 |
| 5,055,851 A | 10/1991 | Sheffer | 342/457 |
| 5,177,490 A | 1/1993 | Ando et al. | 342/357 |
| 5,223,844 A | 6/1993 | Mansell et al. | 342/357 |
| 5,262,774 A | 11/1993 | Kuwahara et al. | 340/988 |
| 5,334,986 A | 8/1994 | Fernhout | 342/357 |
| 5,365,450 A | 11/1994 | Schuchman | 364/449 |
| 5,398,190 A | 3/1995 | Wortham | 364/460 |
| 5,430,432 A * | 7/1995 | Camhi et al. | 340/438 |
| 5,483,455 A | 1/1996 | Lay et al. | 364/448 |

(Continued)

FOREIGN PATENT DOCUMENTS

CA 2133673 4/1996

OTHER PUBLICATIONS

Omega Research and Development, Inc., "GPS 2000", distributed at Consumer Electronics Show in Las Vegas, NV, Jan. 2001, pp. 1-4.

(Continued)

*Primary Examiner*—Daryl Pope
(74) *Attorney, Agent, or Firm*—Allen, Dyer, Doppelt, Milbrath & Gilchrist, P.A.

(57) ABSTRACT

A speed exceeded notification device may be installed in a vehicle of a type including a vehicle data communications bus extending throughout the vehicle, and at least one vehicle indicator coupled to the vehicle data communications bus. The speed exceeded notification device may include a wireless communications device, and a controller to be coupled to the vehicle data communications bus. The controller may be for determining when a vehicle speed exceeds a speed threshold for a first time period, and based thereon may cooperate with the wireless communications device to send a remote vehicle speed exceeded notification. The controller may also determine when the vehicle speed exceeds the speed threshold for a second time period less than the first time period, and may generate a local vehicle speed exceeded notification using the at least one vehicle indicator coupled to the vehicle data communications bus so that a driver of the vehicle can reduce the speed of the vehicle and avoid sending of the remote vehicle speed exceeded notification.

25 Claims, 6 Drawing Sheets

U.S. PATENT DOCUMENTS

| | | | | | |
|---|---|---|---|---|---|
| 5,515,043 | A | | 5/1996 | Berard et al. | 340/988 |
| 5,515,285 | A | | 5/1996 | Garrett, Sr. et al. | 364/460 |
| 5,570,087 | A | | 10/1996 | Lemelson | 340/870.05 |
| 5,572,204 | A | | 11/1996 | Timm et al. | 340/988 |
| 5,587,715 | A | | 12/1996 | Lewis | 342/357 |
| 5,588,038 | A | | 12/1996 | Snyder | 379/57 |
| 5,636,145 | A | * | 6/1997 | Gorman et al. | 702/148 |
| 5,650,774 | A | | 7/1997 | Drori | 340/825.32 |
| 5,659,290 | A | * | 8/1997 | Haeri | 340/441 |
| 5,673,305 | A | | 9/1997 | Ross | 379/58 |
| 5,682,133 | A | | 10/1997 | Johnson et al. | 340/426 |
| 5,719,551 | A | | 2/1998 | Flick | 340/426 |
| 5,777,580 | A | | 7/1998 | Janky et al. | 342/457 |
| 5,825,283 | A | | 10/1998 | Camhi | 340/438 |
| 5,895,436 | A | | 4/1999 | Savoie et al. | 701/214 |
| 5,939,975 | A | | 8/1999 | Tsuria et al. | 340/426 |
| 5,944,768 | A | | 8/1999 | Ito et al. | 701/200 |
| 5,952,933 | A | | 9/1999 | Issa et al. | 340/825.31 |
| 5,969,433 | A | | 10/1999 | Maggiora et al. | 307/10.5 |
| 5,983,161 | A | | 11/1999 | Lemelson et al. | 701/301 |
| 5,986,543 | A | | 11/1999 | Johnson | 340/426 |
| 6,011,460 | A | | 1/2000 | Flick | 340/426 |
| 6,018,657 | A | | 1/2000 | Kennedy, III et al. | 455/426 |
| 6,021,319 | A | | 2/2000 | Tigwell | 455/151.2 |
| 6,025,744 | A | | 2/2000 | Bertolet et al. | 340/426 |
| 6,028,537 | A | | 2/2000 | Suman et al. | 340/988 |
| 6,037,862 | A | * | 3/2000 | Ying | 340/441 |
| 6,049,269 | A | | 4/2000 | Byrd et al. | 340/426 |
| 6,055,426 | A | | 4/2000 | Beasley | 455/432 |
| 6,067,007 | A | | 5/2000 | Gioia | 340/426 |
| 6,069,570 | A | | 5/2000 | Herring | 340/825.49 |
| 6,075,458 | A | | 6/2000 | Ladner et al. | 340/825.49 |
| 6,101,443 | A | | 8/2000 | Kato et al. | 701/210 |
| 6,116,639 | A | | 9/2000 | Breed et al. | 280/735 |
| 6,128,571 | A | | 10/2000 | Ito et al. | 701/201 |
| 6,131,067 | A | | 10/2000 | Girerd et al. | 701/213 |
| 6,133,855 | A | | 10/2000 | Kim | 340/932.2 |
| 6,140,956 | A | | 10/2000 | Hillman et al. | 342/357.07 |
| 6,148,212 | A | | 11/2000 | Park et al. | 455/456 |
| 6,151,551 | A | | 11/2000 | Geier et al. | 701/207 |
| 6,154,648 | A | | 11/2000 | Comer | 455/426 |
| 6,154,658 | A | | 11/2000 | Caci | 455/466 |
| 6,166,626 | A | | 12/2000 | Janky et al. | 340/426 |
| 6,167,255 | A | | 12/2000 | Kennedy, III et al. | 455/414 |
| 6,169,497 | B1 | | 1/2001 | Robert | 340/988 |
| 6,195,597 | B1 | | 2/2001 | Yamada | 701/1 |
| 6,211,818 | B1 | | 4/2001 | Zach, Sr. | 342/357.07 |
| 6,236,365 | B1 | | 5/2001 | LeBlanc et al. | 342/457 |
| 6,240,365 | B1 | | 5/2001 | Bunn et al. | 701/213 |
| 6,240,773 | B1 | * | 6/2001 | Rita et al. | 73/114.01 |
| 6,259,381 | B1 | | 7/2001 | Small | 340/988 |
| 6,275,773 | B1 | | 8/2001 | Lemelson et al. | 701/301 |
| 6,298,306 | B1 | | 10/2001 | Suarez et al. | 701/213 |
| 6,313,791 | B1 | | 11/2001 | Klanke | 342/357.17 |
| 6,314,366 | B1 | | 11/2001 | Farmakis et al. | 701/201 |
| 6,320,535 | B1 | | 11/2001 | Hillman et al. | 342/357.1 |
| 6,321,091 | B1 | | 11/2001 | Holland | 455/466 |
| 6,330,499 | B1 | | 12/2001 | Chou et al. | 701/33 |
| 6,331,825 | B1 | | 12/2001 | Ladner et al. | 340/988 |
| 6,339,745 | B1 | | 1/2002 | Novik | 701/208 |
| 6,346,876 | B1 | | 2/2002 | Flick | 340/426 |
| 6,452,483 | B2 | | 9/2002 | Chen et al. | 340/425.5 |
| 6,462,675 | B1 | * | 10/2002 | Humphrey et al. | 340/905 |
| 6,512,461 | B1 | | 1/2003 | Benzie et al. | 340/825.22 |
| 6,567,012 | B1 | | 5/2003 | Matsubara et al. | 340/825.72 |
| 6,701,234 | B1 | * | 3/2004 | Vogelsang | 701/35 |
| 6,756,885 | B1 | | 6/2004 | Flick | 340/426.1 |
| 6,756,886 | B2 | | 6/2004 | Flick | 340/426.1 |
| 6,812,829 | B1 | | 11/2004 | Flick | 340/426.11 |
| 6,888,495 | B2 | | 5/2005 | Flick | 342/357.07 |
| 6,924,750 | B2 | | 8/2005 | Flick | 340/989 |
| 7,010,402 | B2 | | 3/2006 | Flick | 701/36 |
| 7,015,830 | B2 | | 3/2006 | Flick | 340/989 |
| 7,046,126 | B2 | | 5/2006 | Flick | 340/426.36 |
| 7,068,153 | B2 | | 6/2006 | Flick | 340/426.36 |
| 7,091,822 | B2 | | 8/2006 | Flick et al. | 340/5.72 |
| 7,224,083 | B2 | | 5/2007 | Flick | 307/10.6 |
| 7,375,624 | B2 | * | 5/2008 | Hines et al. | 340/438 |
| 7,391,305 | B2 | * | 6/2008 | Knoll et al. | 340/438 |
| 2001/0045886 | A1 | | 11/2001 | Minowa | 340/7.45 |
| 2007/0115113 | A1 | | 5/2007 | Wang | 340/539.13 |

OTHER PUBLICATIONS

Omega Research and Development, Inc., "Omega Thinks Customers Don't Know Jack!", distributed at Consumer Electronics Show in Las Vegas, NV, Jan. 2001, one page.

* cited by examiner

VEHICLE DEVICE TO ACTIVATE A VISUAL OR AUDIBLE ALERT AND ASSOCIATED METHODS

FIELD OF THE INVENTION

The present invention relates to the field of vehicle devices, and, more particularly, to a vehicle speed exceeded notification device, and related methods.

BACKGROUND OF THE INVENTION

Motor vehicles, such as passenger cars, trucks, busses, fleet vehicles, etc. are widely used, and knowing the locations of such vehicles is often desired. For example, should a vehicle be stolen it would be beneficial to know the vehicle's location so that authorities could be promptly and accurately directed to retrieve the vehicle. Indeed, the tracking system could plot the getaway path of the thief.

For a company with hired drivers, it may be desirable to know the driver's whereabouts during the course of the day. Similarly, a rental car agency or other fleet operator, for example, may wish to know the whereabouts of its fleet of vehicles.

It may also be desirable to track the location of a vehicle as it is used throughout the course of a normal day. For parents of younger or older drivers, for example, knowledge of the vehicle's location may provide some assurance that the driver is at designated locations and following a prescribed route.

The widespread availability and use of the Internet has prompted a number of vehicle tracking systems to also make use of the Internet. For example, TelEvoke, Inc. proposed such a system in combination with Clifford Electronics. The system was to provide notification, control and tracking services via the telephone or the Internet. Users could be notified via phone, e-mail, or a pager of events such as a car alarm being triggered. Users could control the vehicle remote devices via the phone, the web, or a PDA, such as unlocking car doors. Additionally, users could track TelEvoke-enabled vehicles on the Internet or via the telephone. An Internet map could be viewed by the user showing the actual and prior vehicle locations. TelEvoke offered its services via a centralized fully automated Network Operations Center. To reduce the communications costs, it was proposed to use the control channel of the cellular telephone network.

A number of significance advances in vehicle tracking technology are disclosed, for example, in U.S. Pat. No. 7,015,830 to Flick, and assigned to the assignee of the present invention. This patent discloses a vehicle tracking unit for a vehicle of a type including a vehicle data bus extending throughout the vehicle and at least one operable vehicle device connected thereto. The at least one operable vehicle device may be responsive to at least one data bus code on the vehicle data bus. The vehicle tracking unit may include a vehicle position determining device, a wireless communications device, and a controller cooperating with the vehicle position determining device and the wireless communications device to send vehicle position information to a user. Moreover, the controller may generate the at least one data bus code on the vehicle data bus to control the at least one operable vehicle device based upon a command signal received by the wireless communications device.

Another significant advance in vehicle tracking relates to speed exceeded notifications and is disclosed in U.S. Pat. No. 6,888,495 to Flick and assigned to the assignee of the present invention. The patent discloses a tracking system controller being switchable to be in an armed mode for cooperating with a vehicle position determining device and a wireless communications device to generate, and send a speeding alert message based upon the vehicle exceeding a speed threshold for longer than a predetermined time indicative of aggressive driving of the vehicle. A monitoring station may generate a series of speeding alert message notifications for a user based upon receiving the speeding alert message from the vehicle tracking unit. The monitoring station may cancel any remaining speeding alert message notifications of the series based upon a cancellation command response from an entity already having received the speeding alert message notification. Accordingly, if the user may be reached at different telephone numbers or different users are desirably notified of the alert, then unnecessary notifications are avoided. Of course, other approaches for using a vehicle tracker to influence/monitor a vehicle regarding excessive speed may also be desirable.

SUMMARY OF THE INVENTION

In view of the foregoing background, it is therefore an object of the present invention to provide a speed exceeded notification device that may be readily used in a vehicle including a data communications bus and related methods.

This and other objects, features, and advantages in accordance with the present invention are provided by a speed exceeded notification device to be installed in a vehicle of a type comprising a vehicle data communications bus extending throughout the vehicle. The vehicle may have at least one vehicle indicator coupled to the vehicle data communications bus. The speed exceeded notification device may comprise a wireless communications device, and a controller to be coupled to the vehicle data communications bus. The controller may be for determining when a vehicle speed exceeds a speed threshold for a first time period, and based thereon, the controller may cooperate with the wireless communications device to send a remote vehicle speed exceeded notification, for example. The controller may also determine when the vehicle speed exceeds the speed threshold for a second time period less than the first time period and generate a local vehicle speed exceeded notification using the at least one vehicle indicator coupled to the vehicle data communications bus. Accordingly, the local speed exceeded notification allows the driver of the vehicle to reduce the speed of the vehicle, and avoid sending of the remote vehicle speed exceeded notification. In addition, the speed exceeded notification device is readily integrated in a vehicle having a data communications bus, and this may be especially useful in vehicle aftermarket applications, where such functionality is desirably added to a vehicle after its manufacture.

The local vehicle speed exceeded notification may comprise at least one of an audible notification, a visual notification, and a tactile notification. At least one of the speed threshold, the first time period, and the second time period may be user selectable, for example. The vehicle further may further comprise at least one other vehicle device generating data related to vehicle speed on the vehicle data communications bus.

The controller may also be for reading the data related to vehicle speed from the vehicle data communications bus. The at least one other vehicle device generating data related to vehicle speed on the vehicle data communications bus may include a vehicle position determining device, for example. The vehicle position determining device may include a Global Positioning System (GPS) receiver. The vehicle position determining device may also cooperate with the wireless communications device. The wireless communications device may include a cellular communications device, for example.

The remote vehicle speed exceeded notification may further comprise an identity of the vehicle, a speed of the vehicle, and/or a vehicle position, for example. The remote vehicle speed exceeded notification may further comprise a time the vehicle exceeded the speed threshold.

A method aspect is for generating a speed exceeded notification in a vehicle of a type comprising a vehicle data communications bus extending throughout the vehicle, and at least one vehicle indicator coupled to the vehicle data communications bus. The method may comprise using a controller coupled to the vehicle data communications bus for determining when a vehicle speed exceeds a speed threshold for a first time period. Based thereon the controller may cooperate with a wireless communications device to send a remote vehicle speed exceeded notification. The controller may also determine when the vehicle speed exceeds the speed threshold for a second time period less than the first time period, and generate a local vehicle speed exceeded notification using the at least one vehicle indicator coupled to the vehicle data communications bus.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternative embodiments.

Figure 1:
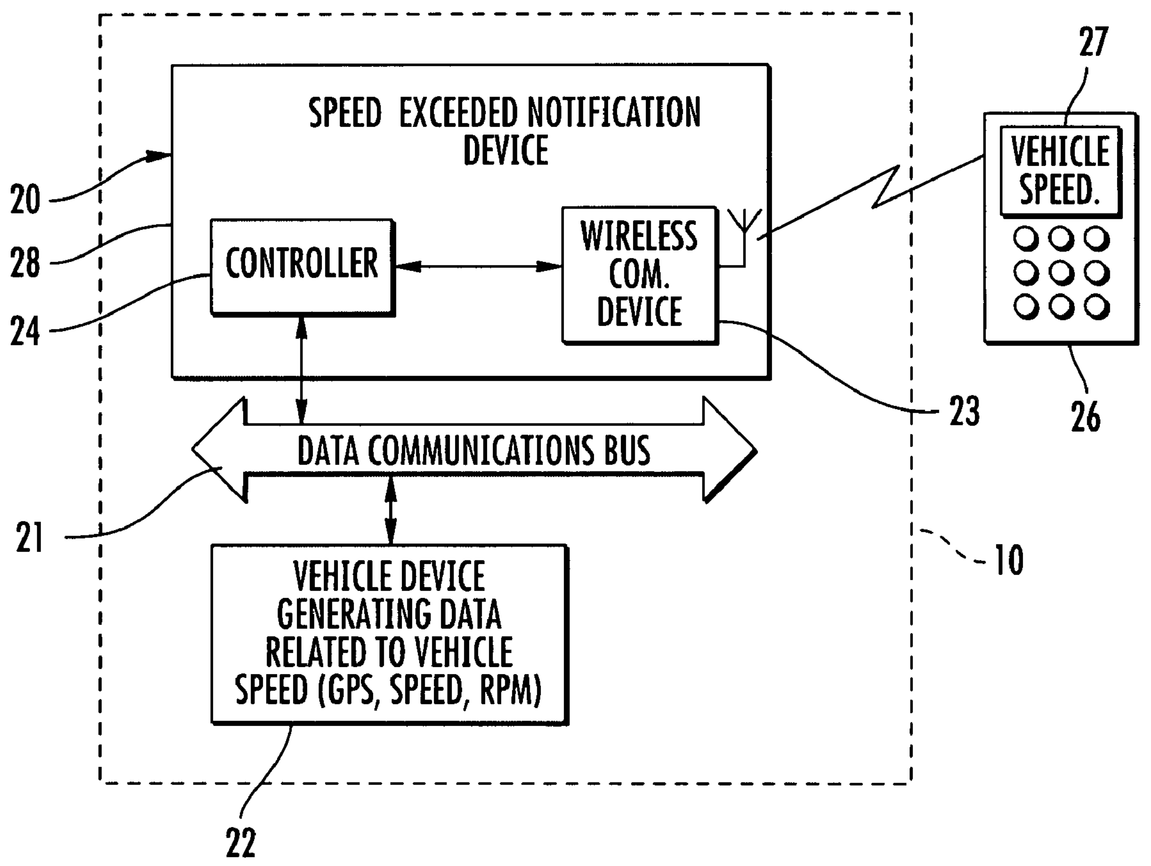
FIG. 1 is a schematic block diagram of a speed exceeded notification device in accordance with the invention.

Referring initially to FIG. 1, a first embodiment of a speed exceeded notification device 20 is now described. The speed exceeded notification device 20 is illustratively installed in a vehicle 10 of a type comprising a vehicle data communications bus 21 extending throughout the vehicle. Illustratively, a vehicle device 22 generates data related to vehicle speed on the vehicle data communications bus 21. Of course, in other embodiments, more than one vehicle device may generate data related to the vehicle speed. The data related to the vehicle speed may include a vehicle speed signal that includes a digital vehicle speed code. Alternatively or additionally, the data related to vehicle speed may be geographical position data, such as based upon GPS position data; or engine RPM in combination with transmission gearing, for example, that may be used to calculate the vehicle speed.

The speed exceeded notification device 20 includes a wireless communications device 23 and a controller 24 coupled to the vehicle data communications bus 21. The controller 24 is for reading the data related to vehicle speed from the vehicle data communications bus 21, and for determining when a vehicle speed exceeds a speed threshold for a first time period. The speed threshold may be user selectable and may be in a range of about 55 to 80 miles per hour, for example. The speed threshold may also be determined based upon the vehicle's location, and a look-up table having the speeds for various roads, as will be appreciated by those skilled in the art.

The first time period may also be user selectable and may be in a range of about 30 seconds to 5 minutes. Of course, other speed ranges, and time durations may also be used. If the speed threshold is exceeded for the first time period, the controller 24 cooperates with the wireless communications device 23 to send a remote vehicle speed exceeded notification.

The controller 24 may be provided by a processor operating under stored program control, and/or may include discrete analog and digital circuits as will be appreciated by those skilled in the art. The controller 24, in some embodiments, may be a multi-vehicle compatible controller such as described in U.S. Pat. Nos. 6,346,876; 6,756,885; 6,756,886; 6,812,829; 7,010,402; 7,046,126; 7,068,153; 7,091,822 and 7,224,083 all assigned to the assignee of the present invention and incorporated herein by reference. In other embodiments, the controller 24 may be a single vehicle or single vehicle platform controller as will also be appreciated by those skilled in the art.

The wireless communications device 23 may be a cellular telephone communication device that sends the remote vehicle speed exceeded notification as a text message, for example. In another embodiment, the wireless communications device 23 may be another type of wireless communications device using another protocol, for example, and may send the notification in another format, such as an email, or voice message, for example, as will be appreciated by those skilled in the art. Of course, the wireless communications device 23 may be included within a common housing 28 of the device 20, or may be a separate and removable device, such as the user's personal cellular telephone.

A remote wireless device, such as the illustrated cellphone 26, is for receiving the remote vehicle speed exceeded signal from the wireless device 23 at the vehicle. The remote wireless device may be a PDA, pager, etc. or other wireless device capable of receiving messages from the wireless communications device 23. The remote wireless device 26 may also be a fixed central monitoring station that may act upon the speeding notification, or that may forward the speeding notification onto a subscriber, such as an employer, parent or relative, or other authority figure as will be appreciated by those skilled in the art. The remote wireless device in the form of the cellphone 26 illustratively includes a display 27 that may be used to display a speeding notification. The remote wireless device 26 may communicate directly with the wireless communications device 23 in the vehicle 10, or may communicate via intervening cellular communications infrastructure, and/or Internet infrastructure as will also be appreciated by those skilled in the art.

Figure 2:
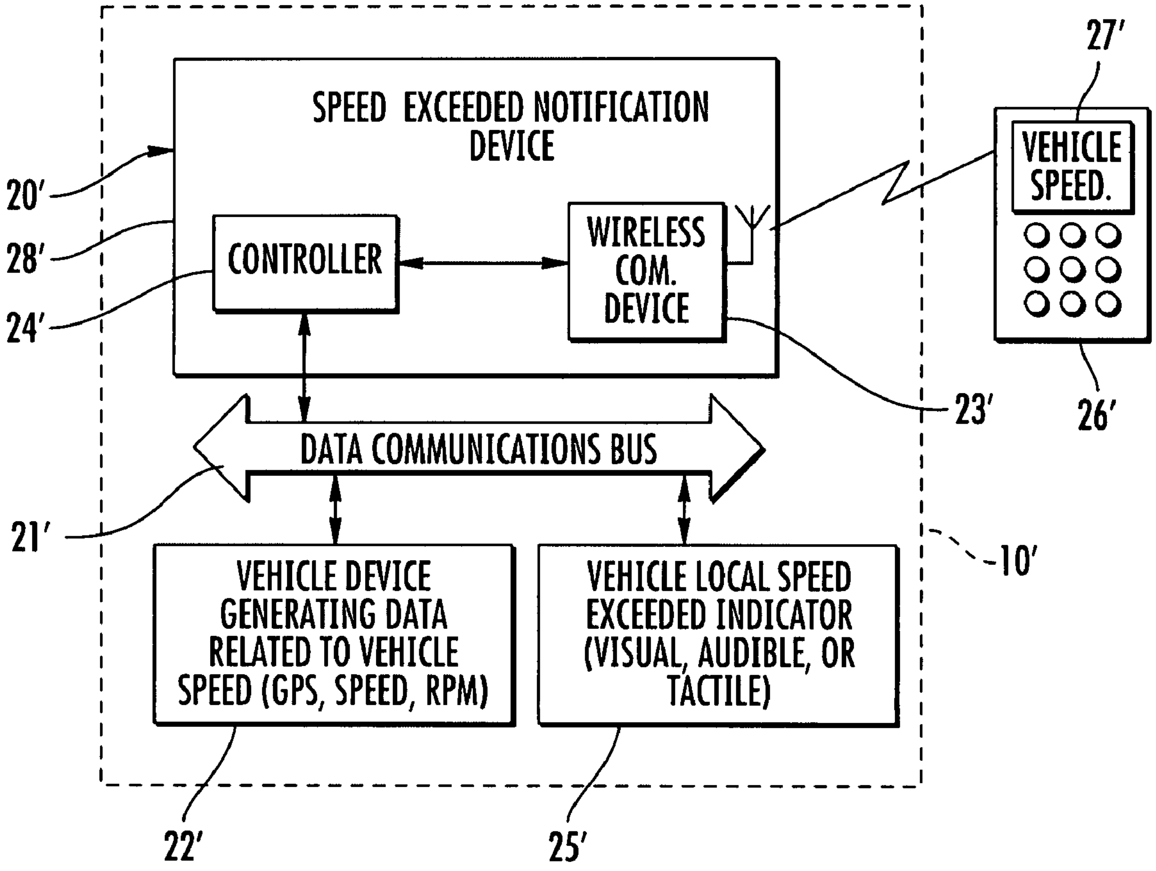
FIG. 2 is schematic block diagram of another embodiment of a speed exceeded notification device in accordance with the invention.

Referring now to the embodiment shown in FIG. 2, the illustrated controller 24' of the speed exceeded notification device 20' may also determine when the vehicle speed exceeds the speed threshold for a second time period less than the first time period. If the vehicle speed exceeds the speed threshold for a second time period less than the first time period, the controller 24' generates a local vehicle speed exceeded notification on a vehicle indicator 25'. The second time period may also be user selectable and may be in a range of about 2 seconds to 1 minute, for example. In other words, this local vehicle speed notification may serve as a warning to the driver to slow down before the remote speed exceeded notification is sent.

The vehicle local speed exceeded indicator 25' may produce an audible notification, such as a door chime, a horn honk, a radio volume adjustment, or an automated voice message for example. Alternatively or additionally, the vehicle local speed exceeded indicator 25' may produce a visual notification, such as a flash of the dome light, illumination or flashing of a dashboard light, or operation of any other visual indicator, for example. In addition, the vehicle local speed exceeded indicator 25' may be a tactile notification indicator, such as a causing steering wheel vibration, seat vibration, etc. The local indication may be repetitive and increasing in urgency as the full first time period is approached. For example, the repetition frequency, audible pitch, or volume may be progressively increasing. The local speed notification on the vehicle indicator 25' allows the driver of the vehicle to reduce the speed of the vehicle and avoid sending of the remote vehicle speed exceeded notification to the remote wireless device 26'.

Moreover, in the illustrated embodiment, this vehicle local speed exceeded indicator 25' is connected to the vehicle data bus 21' and may be an existing vehicle device as installed during vehicle manufacturer or may be added as an aftermarket item as will be appreciated by those skilled in the art. In some other embodiments, the local speed exceeded indicator 25' may be hardwired to the controller 241' and may even be contained within the housing 28' of the speed exceeded notification device 20' as will also be appreciated by those skilled in the art. Those other elements shown in FIG. 2, and not discussed in detail, are indicated by prime notation and are similar to those elements discussed above with respect to FIG. 1.

Figure 3:
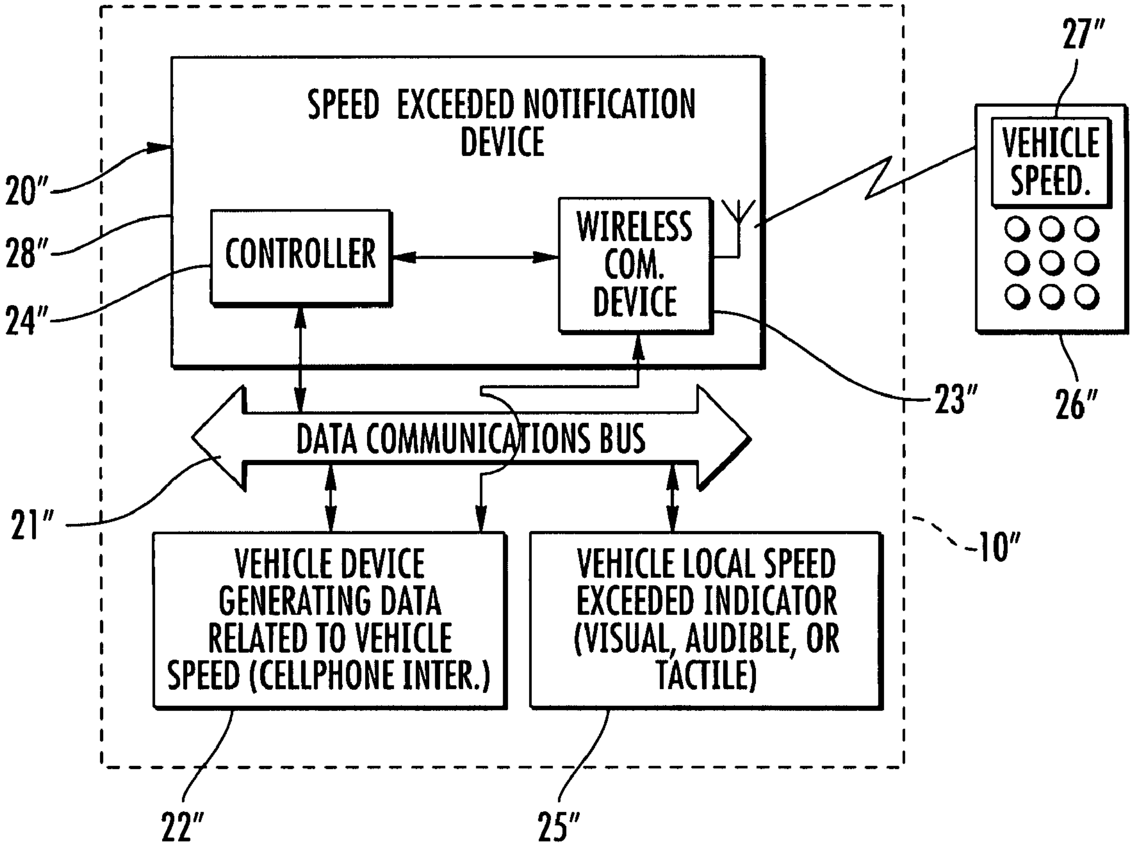
FIG. 3 is schematic block diagram of yet another embodiment of a speed exceeded notification device in accordance with the invention.

Referring now additionally to the embodiment shown in FIG. 3, another variation is now described as relating to generating the vehicle speed data. In this embodiment of the speed exceeded notification device 20", the data related to the vehicle speed is generated based upon cooperation with the wireless communications device 23". For example, the wireless communications device 23" may be a cellular telephone based device that generates position data either based upon an internal GPS receiver, or based upon triangulation or other cellular telephone-based position determining approaches. In other words, the vehicle device generating data related to vehicle speed 22" on the vehicle data communications bus 21" may be an interface circuit between the wireless communications device 23" and the data communications bus as will be appreciated by those skilled in the art. Those other elements shown in FIG. 3, and not discussed in detail, are indicated by double prime notation and are similar to those elements discussed above with respect to FIGS. 1 and 2.

Figure 4:
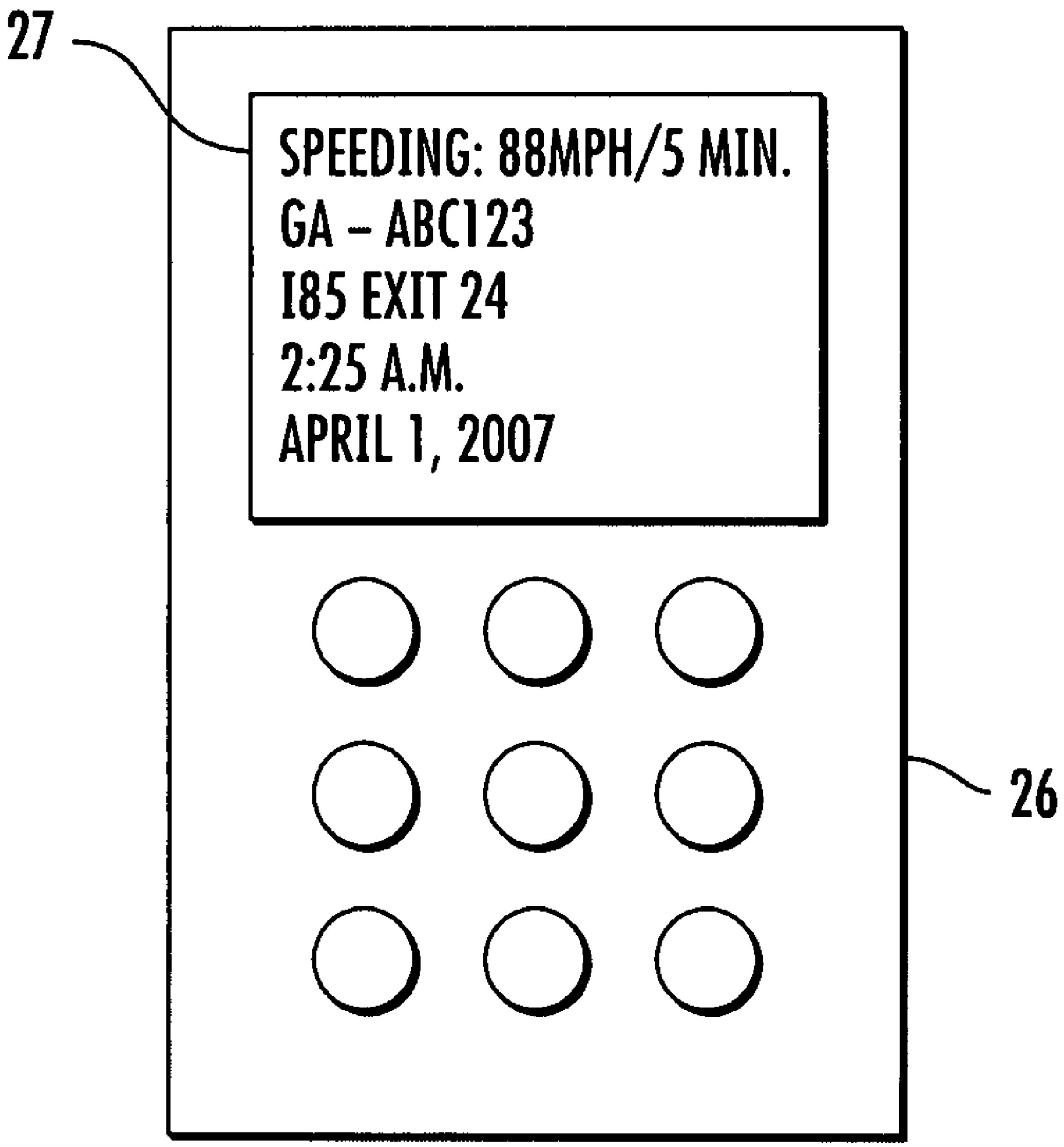
FIG. 4 is an enlarged schematic front view of the cellular telephone as in the system of FIG. 1 illustrating a remote speed exceeded notification.

Referring additionally to FIG. 4, an exemplary remote vehicle speed exceeded notification is shown on the display 27 of the remote wireless device 26 and includes an identity of the vehicle by its license plate number, GA-ABC123. The remote vehicle speed exceeded notification also includes a speed of the vehicle, 88 mph for a time of 5 minutes; a vehicle position, I85 at Exit 24; and the time and date the vehicle exceeded the speed threshold, 2:25 AM, Apr. 1, 2007. Of course, additional or alternative vehicle information may be sent by the controller 24 to the remote vehicle speed exceeded display device 26, as will be appreciated by those having ordinary skill in the art. For example, a speed versus time profile could be generated in the display 27. Additionally, the controller 24 can advantageously send the remote vehicle speed exceeded notifications to the remote wireless device 26 in real time when the speed and time thresholds are exceeded, on a regular schedule, or based on any other triggering event, such as a when the vehicle speed drops below the same threshold or different threshold so that a speeding time can be determined, or upon a collision as may be indicated by an airbag deployment, for example.

Figure 5:
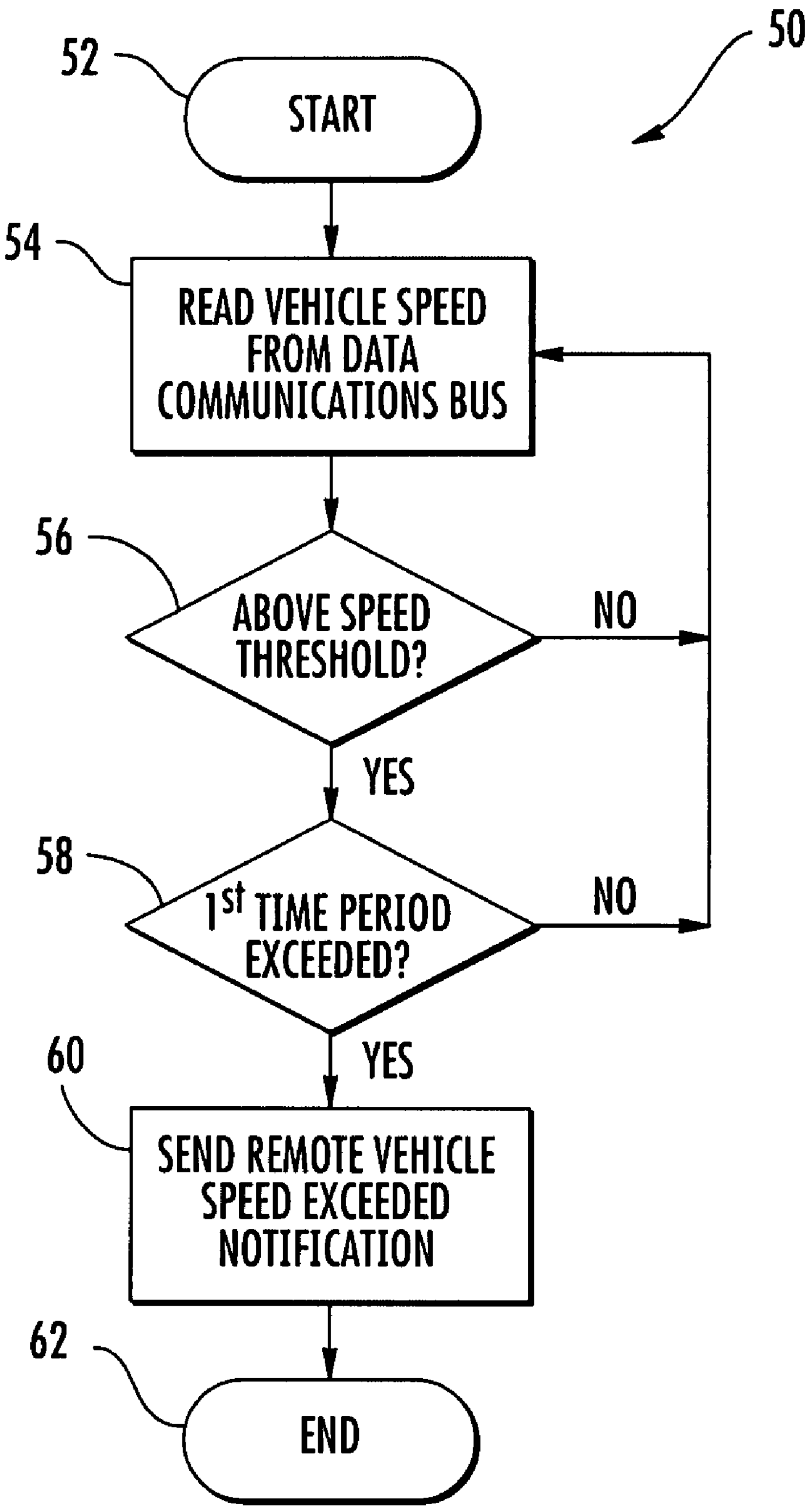
FIG. 5 is a flowchart of operation of a speed exceeded notification device in accordance with the present invention.

Referring now additionally to the flowchart 50 of FIG. 5, a method for speed exceeded notification in a vehicle of a type comprising a vehicle data communications bus extending throughout the vehicle is now described. After the start at Block 52, the method includes using a controller 24 coupled to the vehicle data communications bus 21 for reading the data related to vehicle speed from the vehicle data communications bus (Block 54). From the vehicle data it is determined when a vehicle speed exceeds a speed threshold (Block 56) for a first time period (Block 58). The method further includes using the controller 24 cooperating with the wireless communications device 23 to send a remote vehicle speed exceeded notification to the remote wireless device 26 (Block 60) if both the speed threshold (Block 56) and time threshold (Block 58) have been exceeded, before ending at Block 62.

Figure 6:
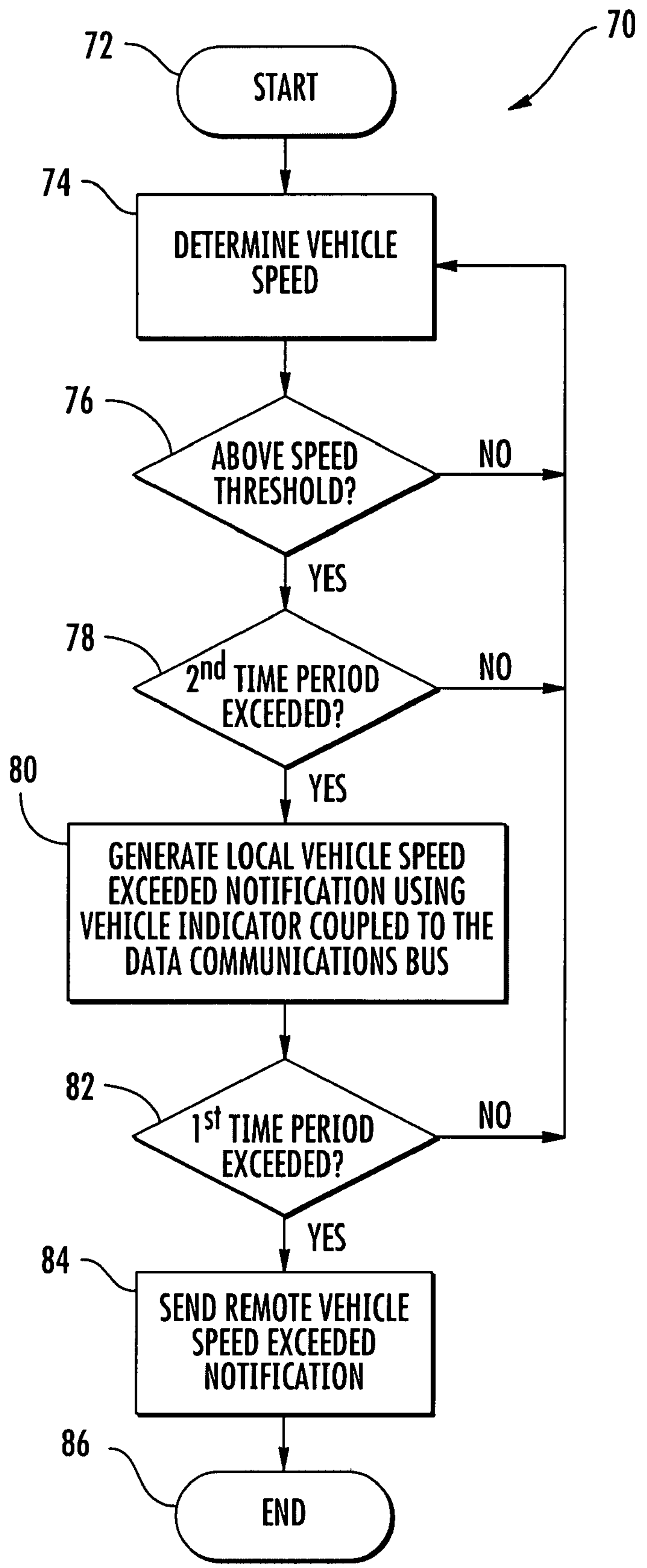
FIG. 6 is another flowchart of operation of another embodiment of a speed exceeded notification device in accordance with the present invention.

Referring now additionally to the flowchart 70 of FIG. 6, another method is described for speed exceeded notification in a vehicle of a type comprising a vehicle data communications bus 21 extending throughout the vehicle, and at least one vehicle indicator 25 coupled to the vehicle data communications bus 21. Beginning at Block 72, the method includes using a controller 24 coupled to the vehicle data communications bus 21 for determining a vehicle speed (Block 74). The controller 24 determines if the vehicle exceeds the speed threshold (Block 76), and if for a second time period (Block 78). If the speed threshold is exceeded for the second time period, the controller 24 generates a local vehicle speed exceeded notification using a vehicle indicator 25 coupled to the vehicle data communications bus (Block 80). The controller 24 then determines when the vehicle speed exceeds a speed threshold for a first time period (Block 82) longer than the second time period, and based thereon cooperates with the wireless communications device 23 to send a remote vehicle speed exceeded notification (Block 84) before stopping at Block 86.

This application is related to patent applications entitled, SPEED EXCEEDED NOTIFICATION DEVICE FOR VEHICLE HAVING A DATA BUS AND ASSOCIATED METHODS, Ser. No. 11/844,703, and SPEED EXCEEDED NOTIFICATION DEVICE FOR VEHICLE HAVING A DATA BUS AND ASSOCIATED METHODS, Ser. No. 11/844,648, which are filed on the same date and by the same assignee and inventor, the disclosures of which are hereby incorporated by reference in their entirety. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A speed exceeded notification device to be installed in a vehicle of a type comprising a vehicle data communications bus extending throughout the vehicle, and at least one vehicle indicator coupled to the vehicle data communications bus, the speed exceeded notification device comprising:

a wireless communications device; and a controller to be coupled to the vehicle data communications bus for determining when a vehicle speed exceeds a speed threshold for a first time period and based thereon cooperating with said wireless communications device to send a remote vehicle speed exceeded notification, and determining when the vehicle speed exceeds the speed threshold for a second time period less than the first time period and generating a local vehicle speed exceeded notification using the at least one vehicle indicator coupled to the vehicle data communications bus.

2. The speed exceeded notification device according to claim 1 wherein the local vehicle speed exceeded notification comprises at least one of an audible notification, a visual notification, and a tactile notification.

3. The speed exceeded notification device according to claim 1 wherein at least one of the speed threshold, the first time period, and the second time period is user selectable.

4. The speed exceeded notification device according to claim 1 wherein the vehicle further comprises at least one other vehicle device generating data related to vehicle speed on the vehicle data communications bus; and wherein said controller is also for reading the data related to vehicle speed from the vehicle data communications bus.

5. The speed exceeded notification device according to claim 4 wherein the at least one other vehicle device generating data related to vehicle speed on the vehicle data communications bus comprises a vehicle position determining device.

6. The speed exceeded notification device according to claim 5 wherein said vehicle position determining device comprises a Global Positioning System (GPS) receiver.

7. The speed exceeded notification device according to claim 5 wherein the vehicle position determining device cooperates with said wireless communications device.

8. The speed exceeded notification device according to claim 7 wherein said wireless communications device comprises a cellular communications device.

9. The speed exceeded notification device according to claim 1 wherein the remote vehicle speed exceeded notification further comprises an identity of the vehicle.

10. The speed exceeded notification device according to claim 1 wherein the remote vehicle speed exceeded notification further comprises a speed of the vehicle.

11. The speed exceeded notification device according to claim 1 wherein the remote vehicle speed exceeded notification further comprises a vehicle position.

12. The speed exceeded notification device according to claim 1 wherein the remote vehicle speed exceeded notification further comprises a time the vehicle exceeded the speed threshold.

13. A speed exceeded notification device to be installed in a vehicle of a type comprising a vehicle data communications bus extending throughout the vehicle, at least one vehicle indicator coupled to the vehicle data communications bus, and at least one other vehicle device generating data related to vehicle speed on the vehicle data communications bus, the speed exceeded notification device comprising:

a wireless communications device; and a controller to be coupled to the vehicle data communications bus for reading the data related to vehicle speed from the vehicle data communications bus, determining when a vehicle speed exceeds a speed threshold for a first time period and based thereon cooperating with said wireless communications device to send a remote vehicle speed exceeded notification, and determining when the vehicle speed exceeds the speed threshold for a second time period less than the first time period and generating a local vehicle speed exceeded notification using the at least one vehicle indicator coupled to the vehicle data communications bus so that a driver of the vehicle can reduce the speed of the vehicle and avoid sending of the remote vehicle speed exceeded notification.

14. The speed exceeded notification device according to claim 13 wherein the local vehicle speed exceeded notification comprises at least one of an audible notification, a visual notification, and a tactile notification.

15. The speed exceeded notification device according to claim 13 wherein at least one of the speed threshold, the first time period, and the second time period is user selectable.

16. The speed exceeded notification device according to claim 13 wherein the at least one other vehicle device generating data related to vehicle speed on the vehicle data communications bus comprises a vehicle position determining device.

17. The speed exceeded notification device according to claim 16 wherein the vehicle position determining device cooperates with said wireless communications device.

18. The speed exceeded notification device according to claim 13 wherein the remote vehicle speed exceeded notification further comprises at least one of an identity of the vehicle, a speed of the vehicle, a vehicle position, and a time the vehicle exceeded the speed threshold.

19. A method for speed exceeded notification in a vehicle of a type comprising a vehicle data communications bus extending throughout the vehicle, and at least one vehicle indicator coupled to the vehicle data communications bus, the method comprising:

using a controller coupled to the vehicle data communications bus for determining when a vehicle speed exceeds a speed threshold for a first time period and based thereon cooperating with a wireless communications device to send a remote vehicle speed exceeded notification, and determining when the vehicle speed exceeds the speed threshold for a second time period less than the first time period and generating a local vehicle speed exceeded notification using the at least one vehicle indicator coupled to the vehicle data communications bus.

20. The method according to claim 19 wherein the local vehicle speed exceeded notification comprises at least one of an audible notification, a visual notification, and a tactile notification.

21. The method according to claim 19 wherein at least one of the speed threshold, the first time period, and the second time period is user selectable.

22. The method according to claim 19 wherein the vehicle further comprises at least one other vehicle device generating data related to vehicle speed on the vehicle data communications bus; and further comprising using the controller for also reading the data related to vehicle speed from the vehicle data communications bus.

23. The method according to claim 22 wherein the at least one other vehicle device generating data related to vehicle speed on the vehicle data communications bus comprises a vehicle position determining device.

24. The method according to claim 23 wherein the vehicle position determining device cooperates with the wireless communications device.

25. The method according to claim 19 wherein the remote vehicle speed exceeded notification further comprises at least one of an identity of the vehicle, a speed of the vehicle, a vehicle position, and a time the vehicle exceeded the speed threshold.

* * * * *

UNITED STATES PATENT AND TRADEMARK OFFICE

CERTIFICATE OF CORRECTION

PATENT NO. : 7,659,811 B2
APPLICATION NO. : 11/844683
DATED : February 9, 2010
INVENTOR(S) : Flick et al.

It is certified that error appears in the above-identified patent and that said Letters Patent is hereby corrected as shown below:

Column 1, Line 46 Delete: "significance"
Insert: --significant--

Column 2, Line 56 Delete: "vehicle further may"
Insert: --vehicle may--

Column 5, Line 36 Delete: "241'"
Insert: --24'--

Signed and Sealed this

Twenty-fourth Day of August, 2010

David J. Kappos

*Director of the United States Patent and Trademark Office*